Sept. 29, 1964 R. D. BEATTIE ETAL 3,151,043
VAPOR-LIQUID CONTACTING AND MASS TRANSFER
Filed Jan. 18, 1960 3 Sheets-Sheet 1
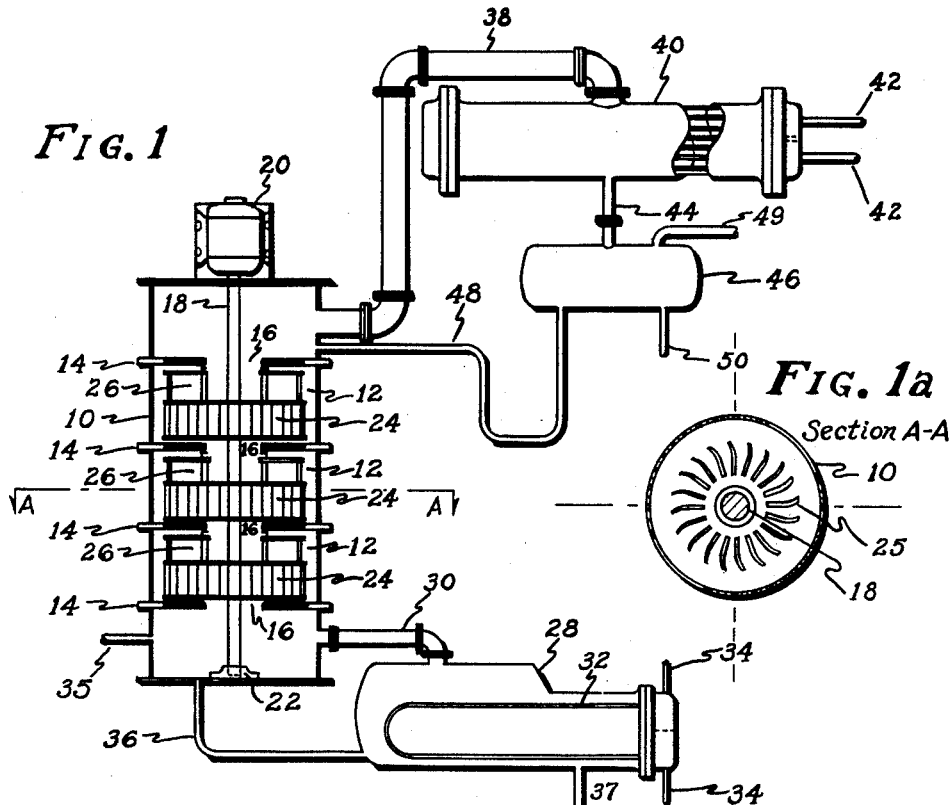
FIG. 1
FIG. 1a
Section A-A
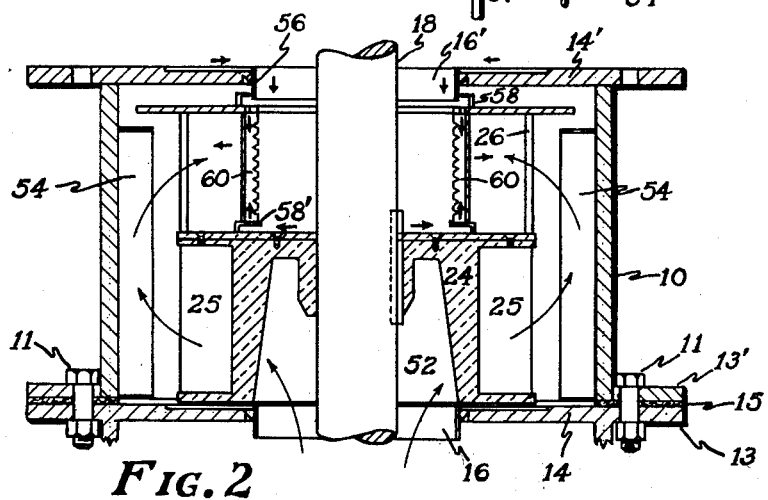
FIG. 2
INVENTORS:
Robert D. Beattie
and Donald F. Othmer
BY Arthur S. Collins
Agent

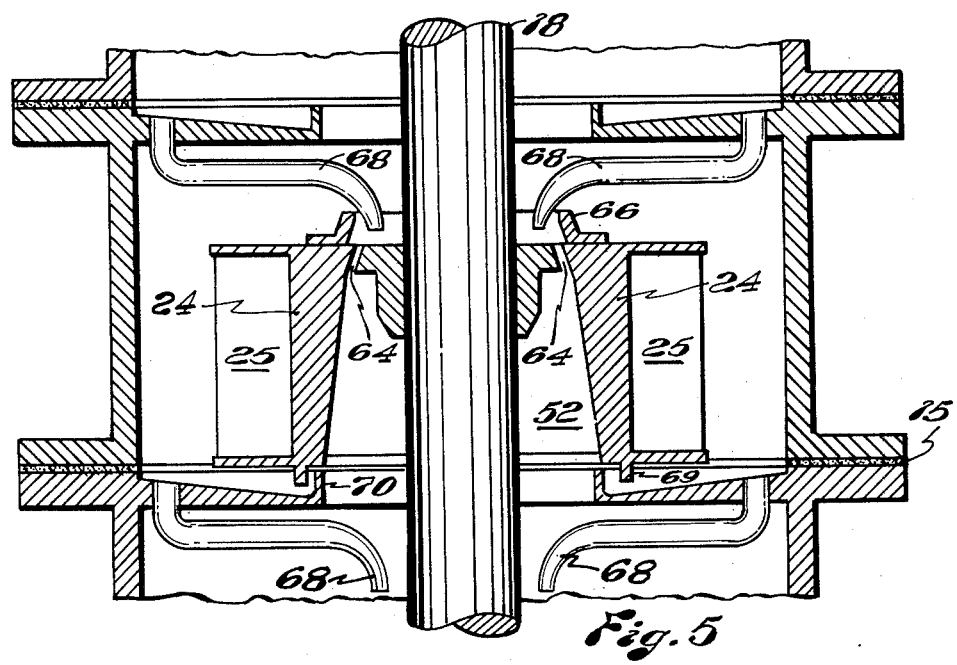
Fig. 5
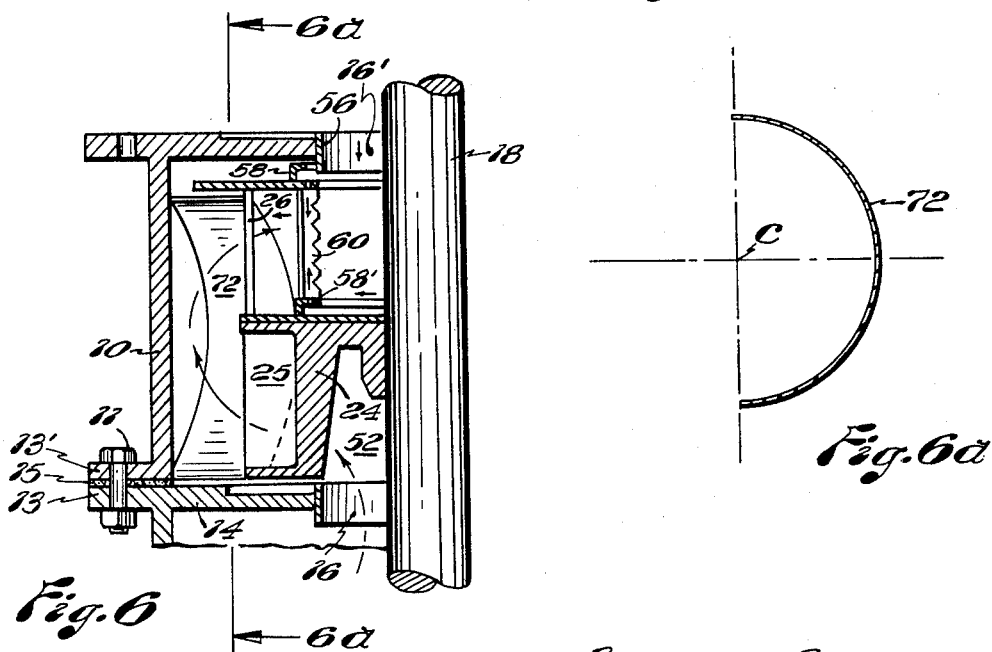
Fig. 6
Fig. 6a
Inventors:
Robert D. Beattie
and Donald F. Othmer
by Arthur S. Collins
Agent

United States Patent Office 3,151,043
Patented Sept. 29, 1964

3,151,043
VAPOR-LIQUID CONTACTING AND
MASS TRANSFER
Robert D. Beattie, 320 Lexington St., Watertown, Mass.,
and Donald F. Othmer, Park Ave., Coudersport, Pa.
Filed Jan. 18, 1960, Ser. No. 2,922
17 Claims. (Cl. 202—40)

This invention relates to the art of conducting vapor-liquid mass transfer processes such as fractional distillations, particularly under vacuum conditions, and to equipment particularly adapted for such use.

The separation of complex mixtures into individual components or particular fractions is often accomplished by capitalizing on volatility differences in a series of successive partial distillations and condensations. This procedure is commonly called fractional distillation or rectification and is usually carried out in some sort of a column such as a packed tower or a plate and cap column, with vapors flowing up through the column interacting with the refluxing liquors running down the column under the influence of gravity. The production capacity of a given column for carrying out a given separation at normal pressures is generally limited chiefly by the vapor velocities and volumes that can be handled smoothly without disrupting flow patterns of the refluxing liquors or causing excessive liquid entrainment. For materials which are so heat sensitive and/or nonvolatile that they must be distilled under high vacuum conditions, production capacities tend to be particularly limited due to the tremendously expanded volumes of vapors which must then be handled and the correspondingly higher linear valocities of the vapors in a volumn of given size. In fact, under high vacuum conditions the resultant pressure drop often becomes an even greater problem than liquid entrainment. Of course, the passage of normal amounts of vapor through a conventional column always entails some pressure drop, i.e., there is always a higher pressure at the base to push these vapors up through the column and overcome friction and other counter forces. As a result there may be a significantly higher pressure at the bottom than at the top of a conventional column even when operated at atmospheric pressure. But, when operating under subatmospheric conditions, vaporization rates generally have to be severely limited in order to avoid excessive or impractical changes in pressure from top to bottom of the column.

Largely as a result of the above difficulties, commercial distillation operations at pressures substantially below atmospheric are less frequently conducted today in conventional plate and cap columns. Instead they are usually conducted in columns containing the minimum amount of packing or divisions or other obstructions to flow. For example, commercial high vacuum distillations are often conducted in special centrifugal devices, often called "molecular stills." The stills are designed for heat sensitive materials and, offering vapor paths substantially free of obstruction, are capable of handling the high vapor volumes resulting from the extremely low pressures used. However, each still in operation provides only a single partial distillation and condensation (i.e., is equivalent to only one plate or stage). Therefore, to accomplish a relatively complex separation continuously, a series of molecular stills is necessary, or else a series of batch runs must be carried out in succession on the same still. Since each still has its own drive shaft, source of vacuum, liquor handling pumps, and other auxiliaries, conducting complex vacuum rectification processes on such equipment either requires much expensive equipment and floor space or else an excessive amount of time and labor. Of even more importance, sometimes, is the fact that heating and cooling effects must be supplied to each still (or each batch run on the same still) independently (or repeatedly) rather than using these thermal quantities over and over as in a usual multiplate column.

The principal object of this inventon is to provide an economical method for conducting multistage vapor-liquid mass transfer processes efficiently and having particularly desirable characteristics for operations at atmospheric pressure or below.

Another important object is to provide multistage distillation apparatus especially adapted for vacuum operation and for handling the large volumes of vapor necessarily involved in obtaining substantial production rates under such conditions.

Still another object is to provide said apparatus in a form which is as compact and as economical to operate as possible.

It is also our object to provide such apparatus having a single drive shaft and a single source of vacuum and requiring no external pumps or piping between stages.

Another important object is to provide such apparatus which is so efficient and so effectively arranged, even when handling large volumes of vapor and correspondingly large amounts of contacting liquids, that the net pressure drop from stage to stage (and indeed the total pressure drop across all stages) can be limited to a relatively insignificant percentage of the absolute pressure of the intended operation, or in fact there may be no net pressure drop or effective vapor friction across the stage—even a decrease of pressure from top to bottom—regardless of how low the operating pressure level may be.

It is also our object to provide highly efficient liquid-vapor interaction and separation efficiency in the individual stages of a multistage distillation column while at the same time minimizing entrainment problems which tend to be severe at high distillation rates under normal pressures or at normal distillation rates under pressures substantially below atmospheric, due to the large volumes of vapor evolved.

Another important object is to provide a versatile multi-stage column capable of fractionating a wide variety of materials efficiently under a wide variety of conditions including some very demanding conditions for which any single column type of apparatus known heretofore has generally been considered unsuitable.

Still other objects and advantages of the present invention will become apparent from the detailed description and discussion which follow:

In accordance with the above objects this invention provides a simple method of conducting fractional distillation through multiple liquid-vapor contacting stages stacked vertically one above another operated at relatively uniform subatmospheric or other pressures without the use of external piping, pumps, heaters, coolers, etc. between stages. This method comprises drawing vapors upwards through each of the several stages in series while allowing reflux liquid to collect in the bottom of each stage and then feed down to the next succeeding stage below by means of gravity and imparting to the vapors in each stage a compressive action or force using elements which simultaneously generate turbulent zones in each stage to which liquid reflux from above is subjected so as to disperse it and bring it into intimate and uniform contact with the vapors in said stage. The elements generating said compressive force in accordance with this invention are designed to given carefully controlled and uniform compressive action which, by adjusting the speed of movement of said elements within their practical operating range, can easily be regulated to compensate largely for or to counteract almost exactly the pressure drop that would otherwise take place in each stage; or in many cases it will be possible even to exceed this pressure drop; i.e., to give a slight exhausting effect in each stage. In this way the entire column or series of equilibrium stages can be made to operate at a relatively constant pressure using a single external vacuum pump or exhausting means connected to the farthest end of the system from the original source of vapor generation.

A more detailed understanding of this distillation method and preferred embodiments of equipment especially adapted for carrying out distillations in said manner will be obtained from the following description given in conjunction with the accompanying drawings, in which:

FIGURE 1 is a general elevational view of a complete set of equipment suitable for use in such distillations showing, largely in section, a typical column comprised in this case of three equilibrium stages, together with a separate still pot or reboiler and other auxiliary equipment, much of which is indicated schematically;

FIGURE 1a is a section along dotted line A—A of FIGURE 1;

Figure 3:
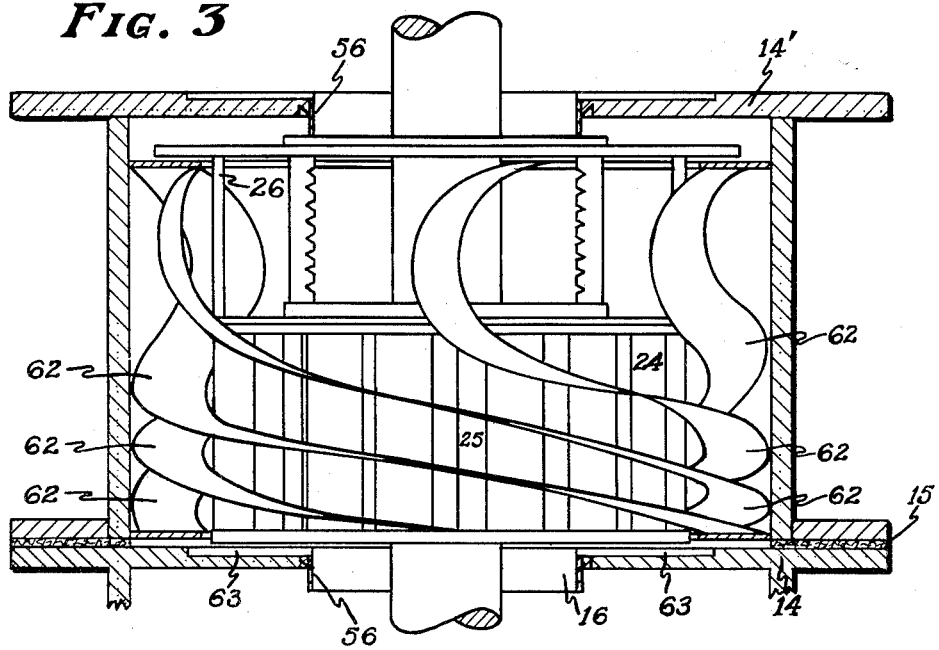
Figure 4:
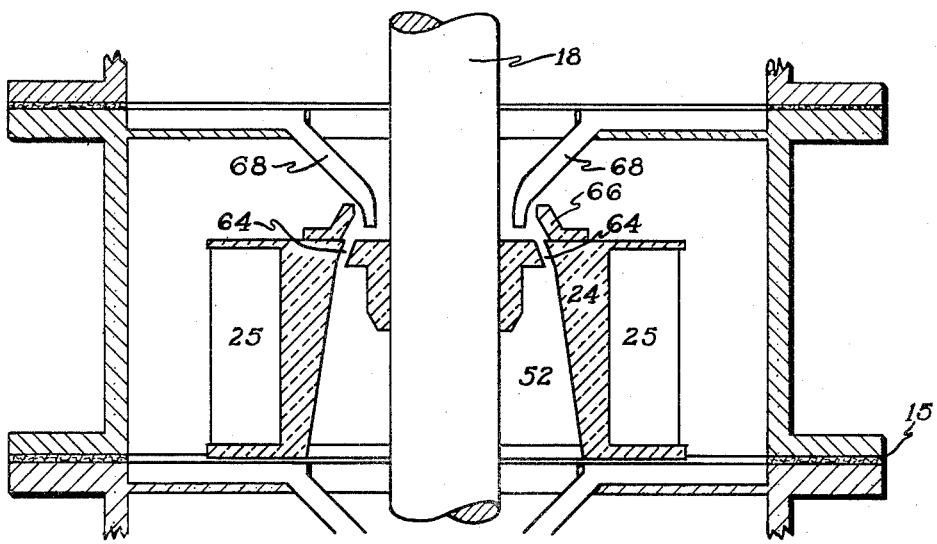

FIGURE 2 is an enlarged vertical section of a single stage from a column such as that shown in FIGURE 1 giving a closer view of the details of construction of the rotor and liquor distributor assembly, which in this case favors countercurrent contacting between the vapors and liquids in said stage. This figure also shows the addition of several straight vertical static vanes in the space between rotor and column shell;

FIGURE 3 is an enlarged vertical section of a single stage very similar to that in FIGURE 2 except in this case a different type of static vane has been mounted in the space surrounding the impeller blades;

FIGURE 4 is an enlarged vertical section of another single stage of different design in that the liquid receiving and distributing portion of the rotor favors concurrent contacting between the vapors and liquids in said stage;

FIGURE 5 is essentially a repetition of FIGURE 4 except that the down pipes are located differently and special means of providing a liquid seal beneath the rotor have been added; and FIGURE 6 is a vertical sectional view of the left side only of a single stage the design of which is similar to that shown in FIGURE 2 except that the static vane in this case is in the shape of a section of a cylinder. FIGURE 6a is a sectional view of said vane only, taken along line 6a—6a of FIGURE 6.

In FIGURE 1, the column 10 is depicted as containing three identical equilibrium stages 12 stacked vertically one above the other. Each stage 12 is separated from the next by a divider plate 14 having a central opening 16. Drive shaft 18 extends the length of the column from drive 20 to internal foot bearing 22 and passes concentrically through each of said central openings 16.

Mounted on said drive shaft 18 in each stage 12 is a multibladed rotor 24 the outer diameter of which is considerably smaller than the inner diameter of the shell of column 10. The individual blades 25 of the rotor can be formed in any suitable shape such as those depicted in FIG. 1a which are basically straight radial blades with backward curved tips. In FIG. 1 there is shown mounted on top of each rotor 24 an additional assembly 26 for receiving reflux liquor from the stage above and distributing and dispersing it through the stage in question.

Reboiler 28 is provided to supply the vapor feed to the bottom of the column 10 through pipe 30. The reboiler is heated by means of coil 32. Steam or other suitable heating medium can be circulated through said coil 32 by means of inlet and outlet connections 34. Liquid reflux is returned to reboiler 28 from the bottom of column 10 through tube 36. Port 35 is provided for introducing fresh feed as needed while any bottoms product may be drawn off at 37.

Vapors leaving the top of column 10 pass out through overhead vapor line 38 into the shell side of the tube and shelltype condenser 40. The coolant for the condenser tubes is introduced and discharged from the tube header through inlet and outlet connections 42. The condensed distillate drains continuously from the condenser 40 through drain pipe 44 into reflux drum 46. From here reflux liquids can be returned at any desired rate to the top of the column 10 through tube 48 while product distillate can be collected at tap 50. If it is desired to operate the system under reduced pressures, it is merely necessary to connect a single ejector, vacuum pump or other discharge device (none of which is represented in the drawings) to reflux drum 46 by means of a branch line 49.

Some of the performance characteristics of our apparatus can be illustrated and explained with the aid of the construction details given in the blown-up views of a single stage shown in FIGURE 2 and of the left half of a single stage shown in FIGURE 6. These views also illustrate a method of joining one stage to another by means of a series of bolts 11 joining flange rings 13 and 13' having a sealing gasket 15 in between. During operation, vapors from the stage below are drawn up through central opening 16 in divider plate 14 into the eye 52 of the multibladed rotor 24. The action of said rotor compresses said vapors while forcing them toward the outer part of the column 10. At the same time the vapors are being forced upward and directed in a streamlined path by the static vanes 54 in FIGURE 2 or static vanes 72 in FIGURE 6. Finally the vapors turn inward again in the upper part of the stages as they are drawn toward the central opening 16' in the upper divider plate 14'. Thus the general vapor path can be described approximately by the curved arrows with relatively long shafts superimposed on FIGURE 2 and FIGURE 6.

Meanwhile the liquid reflux from the stage above runs down through center opening 16' in upper divider plate 14', being guided more selectively by drip ring 56 to the under side of collecting rim 58 which is in the shape of a complete circle at the top of the liquor receiving and distributing assembly 26 which in turn is mounted on top of rotor 24. The liquor collected in circular rim 58 then drains into vertical weirs 60 which are curved troughs describing not over 180° of curvature in cross section and spaced at regular intervals around the assembly. Preferably the edges of these curved weir troughs are notched to provide points for liquid breakup and dispersal as the liquid is thrown out by centrifugal force during rotation. These weir troughs connect at the bottom into a second circular shaped rim 58' which catches or traps liquor accumulated on the top surface of the rotor 24 as it tends to flow outward due to centrifugal force. Thus, liquor can feed into said weir troughs 60 from the bottom as well as from above. The general direction of flow of reflux liquor is, therefore, represented by the short straight arrows indicated in FIGURE 2 and FIGURE 6, and it will thus be seen that in this case the contact between vapors and liquor is essentially countercurrent.

The single stage shown in FIGURE 3 is essentially the same as in FIGURE 2 execpt that a different type of vane is used in the space surrounding the rotor 24 and liquor distributing assembly 26. These particular vanes 62 are in the form of ribbons wound parallel to one another in a helical design as shown. The helical shape rises at a fairly uniform angle (10° is shown here) until a level near the top of the rotor is reached. At this point the angle of rise increases rapidly as each vane translates to a rolled-over approximately semi-cylindrical shape. This design provides somewhat closer control over the vapor flow paths and assures more nearly countercurrent contact between vapor and reflux liquor. The cylindrical form of static vane illustrated in FIGURES 6 and 6a is another design offering similar advantages. Here, the static vanes 72 are shaped like half sections of cylinders, although other sections of cylinders or spheroids are also suitable. As seen more clearly in FIGURE 6a, the vane 72 extends through a full 180° arc about the axis, which runs through point C in a direction normal to the surface of the drawing paper. Another major advantage of such static vanes in general is the relatively large surface provided thereby for film type mass transfer surface, which tends to increase overall efficiency of equipment of a given size while still avoiding vapor pressure drops greater than can be compensated for by the compressive action of an efficient rotor.

The individual blades of the rotor shown in FIGURE 3 as well as the other drawings have a backward swept curved shape but many other designs are, of course, operable as well. In order to position the rotor near the lower divider plate 14 without excessively interfering with the passage of liquor on the top of said plate, multiple grooves 63 are provided in the top of said plate, each extending from a point beyond the outer diameter of the rotor 24 to drip ring 56 in central opening 16 of divider plate 14.

FIGURE 4 and FIGURE 5 are views in the same manner as that of FIGURE 2 but showing a slightly different method of handling reflux liquor distribution. In this embodiment the distribution and dispersal of liquid is handled largely by the multibladed rotor 24 itself by providing holes 64 leading from the top of the rotor into the inside area or eye 52 of the rotor. This is a simpler design and permits the height of an individual stage to be shortened somewhat since the only superstructure mounted on top of the rotor is a ring shaped confining rim 66. Of course, the vapor-liquor contact in this case tends to be essentially concurrent since the liquor distribution and dispersal is achieved by the same multibladed rotor which compresses and directs the flow of vapor. This concurrent action can be emphasized and made more selective by providing enclosed drain tubes 68 for delivering reflux liquor from the stage above into the passages 64 leading to the eye 52 of the rotor. Static vanes can still be used with advantage in a rotor assembly designed for concurrent contacting of liquor and vapor within an individual stage although, for the sake of simplicity, none have been shown in the embodiments depicted in FIGURE 4 and FIGURE 5. It should be remembered, of course, that regardless of the design of internal components of the individual stages, the flow of liquids and vapors from stage to stage of a multistage column still remains countercurrent.

Obviously the specific and preferred embodiments discussed above are merely illustrative and should not be considered as implying any limit on the scope of our invention. For example, many different additional techniques for handling and transferring liquors and vapors from one stage to another will be apparent to those skilled in the art of liquor-vapor contacting and mass transfer operations. Thus, as shown in FIGURE 5, the reflux liquor can be drained from the divider plate above through drainage tubes 68 through the outer portion of said plate instead of, or in addition to, through the central opening in same. It is also possible, as shown in FIGURE 5, to provide a liquid seal between the rotor and the liquor on the divider plate below by using a rotor 24 with a simple hub or casing 69 extending from the under side of same designed to run in a recessed pool or reservoir on top of said divider plate, which can be obtained by providing a suitable depression or cut in the top of said plate with a rim 70 surrounding the central opening in said plate.

Although the advantages of our apparatus over other conventional forms of such equipment are greatest when used with heat sensitive materials for which mass transfer processes must be conducted at subatmospheric pressures in order to minimize operating temperatures, we have found the overall efficiency of our apparatus to be surprisingly high relative to other forms of equipment used for mass transfer operations regardless of the pressure at which such operations are conducted. The wide versatility and the surprising effectiveness of our equipment over a wide range of operating conditions will be illustrated by the following specific examples.

*Example 1.*—A single vapor-liquid contacting stage of the type shown in FIG. 3 and having an inside diameter of about 10″, an interior height of about 6½″ and circular openings of 4″ diameter in both top and bottom divider plates was mounted between two end sections of similar size each equipped with inlet and outlet connections for gas and liquid. A 1¾″ diameter drive shaft extended through the entire assembly passing continuously through the circular openings in the divider plates from a drive on top of the top section to an internal foot bearing at the bottom of the bottom section. Mounted on this shaft in the said contacting stage was a rotor wheel with a 7½″ outside diameter and a 4¼″ inside diameter or eye and containing 20 individual blades each about 3″ high and relatively flat except having a backward curved shape near their tips as shown in the cross-sectional drawing of FIG. 1a. Mounted around the inside wall of said middle stage in the space around the rotor wheel were 6 helical shaped static vanes generated at about a 10° angle to the horizontal. Each vane is about 1″ wide and curls over inwardly in a semicylindrical scroll above the rotor, i.e., in the space around the liquid distribution assembly mounted as a superstructure on top of the rotor wheel, all as indicated in FIGURE 3.

The single contacting stage as described was used to absorb acetone from an air-acetone vapor mixture fed at atmospheric pressure into the bottom section, by means of a water stream fed into the top section. The water was fed from a constant reservoir at a rate of 165 lbs./(hr.)(sq. ft.), while the air-acetone vapor mixture was blown in the bottom section at rates varying from about 100 to 200 lbs./(hr.)(sq. ft.).

The following results were obtained at a rotor speed of 1000 r.p.m.

| Gas Rate, lb./(hr.)(sq. ft.) | $K_{G_a}$, lb. moles/ (hr.)(cu. ft.)(atm.) | $E_{MV}$* (Murphree Plate Efficiency [1]), Percent |
|---|---|---|
| 207 | 6.04 | 53 |
| 182 | 5.67 | 48 |
| 157 | 5.26 | 51 |
| 129 | 4.58 | 53 |
| 104 | 3.85 | 53 |

[1] See Example 2 for definition.

These absorption coefficients are much higher than those reported in the literature for the same air-acetone-water system using conventional towers containing Raschig ring packings. In fact, by increasing the rotor speed of the present apparatus somewhat, e.g., to 1540 r.p.m. the $K_{G_a}$ at a water flow rate of 165 lbs./(sq. ft.)(hr.) and a gas flow rate of 207 lbs./(sq. ft.)(hr.) increased to 8 lb. moles/(hr.)(cu. ft.)(atm.) which compares favorably with the performance of absorption columns packed with the most efficient (and most expensive) extended packings, such as Stedman packing.

If in the above described stage, the 6 helical-shaped static vanes are replaced by 6 straight, vertical static vanes, excellent acetone absorption rates are also obtained, although somewhat higher rotor speeds are necessary to obtain equivalent pressure profiles under a given set of flow rates and conditions.

*Example 2.*—A 10″ inside diameter column was constructed of three contacting stages one above the other in between a top and bottom end section all as depicted in FIGURE 1. A 1¾″ diameter drive shaft extended through the entire column from a drive on top of the top end section to a bearing on the floor of the bottom end section. In each contacting stage a 7½″ outside diameter rotor wheel of the type described in Example 1 was mounted on the drive shaft in the lower portion of each stage. Auxiliary equipment as shown in FIG. 1 was connected to the said column with a vaccum pump connected to reflux drum 46 through line 49. In each stage of this column as in the single contacting stage of Example 1, 6 helical shaped static vanes generated at a 10°" angle to the horizontal were mounted in the space between rotor wheel and column wall, each vane ending in an inwardly curled, semi-cylindrical scroll on top, i.e., in the space surrounding the liquor distributor assembly mounted on top of each rotor wheel.

The above column was employed for vacuum fractionation of mixtures of n-butyl ether and dichloroethyl ether containing about 5 mol percent n-butyl ether and 95 mol percent dichloroethyl ether. Runs were made at absolute pressures of about 20 to 50 mm. Hg and using rotor speeds of 300 to 1520 r.p.m.

At about 30 mm. Hg absolute pressure and about 1000 r.p.m. rotor speed, overhead product enriched to 80 to 92 mol percent n-butyl ether was readily attained using a reflux ratio (defined as weight flow rate of liquid down the column to weight rate of removal of overhead product) of 2.6 and vapor velocities of between about 9 and 4 ft./sec. At about the same absolute pressure and rotor speed and a reflux ratio of only about 1.2, enrichment to about 70 to 88 mol percent n-butyl ether was readily attainable at vapor velocities of about 9 to 4 ft./sec.

Liquor was sampled from the pool at the bottom of each contacting stage as well as from the reboiler and the reflux drum, and its composition determined in each case by refractive index measurements. The vapor compositions were then calculated from the known flow rates and reflux ratios. From these values and the vapor-liquid equilibrium curve for this binary ether system, the Murphree plate efficiencies could be calculated for each of the three contacting stages. This Murphree plate efficiency is defined as the percentage of the total enrichment ideally obtainable by a single theoretical plate which is actually obtained by a given plate or stage.

Since in the present example, the middle stage is the only one which was operating with an adjacent contacting stage both above and below it, the conditions under which it was operating are clearly most representative of conditions that would exist in most stages of a larger multistage column. Therefore the Murphree plate efficiencies ($E_{MV}$*) for this middle stage will presumably be of greatest significance and interest and are, therefore, presented below, all for 30 mm. Hg absolute pressure and about 1000 r.p.m. rotor speed:

| Approx. Reflux Ratio | Approx. Vapor Velocity, ft./sec. | $E_{MV}$*, Percent |
|---|---|---|
| 2.6 | 4–5 | 80 to 89 |
| 2.6 | 7–9 | 70 to 79 |
| 1.2 | 4–5 | 80 to 85 |
| 1.2 | 7–9 | 75 to 80 |
| Total | 4–5 | 70 to 90 |
| Total | 7–9 | 70 to 78 |

Thus it will be seen that Murphree plate efficiencies in the range of 70 to 90% have been obtained with the present equipment operating at 30 mm. Hg and using practical flow rates. This compares favorably with the best performance usually reported for bubble cap or sieve plates or for Kaskade trays, even when operated at total reflux and at normal atmospheric pressure or above.

Using the same apparatus described above in further runs rectifying the same binary ether system, it was found that even higher Murphree plate efficiencies of 100% or somewhat higher could be obtained under similar flow conditions by either increasing the rotor speed to about 1500 r.p.m. or higher or by operating at 50 mm. Hg absolute pressure instead of 30 mm. Hg while maintaining the original rotor speed of approximately 1000 r.p.m.

At an absolute pressure of 50 mm. Hg and a rotor speed of about 1600 r.p.m., Murphree plate efficiencies as high as 150% were obtained with the same binary ether system when using total reflux.

Throughout the above runs the net pressure loss per stage, using the figures for the middle stage as representative of the average stage, was generally of the order of about 0.03 mm. Hg or approximately 0.1% of the total absolute pressure of 30 mm. Hg absolute pressure. This means that a distillation column built and operated in accordance with our invention should be capable of providing the equivalent of approximately 10 theoretical plates with a maximum pressure differential from top to bottom of the column of only about 1% of the total pressure, even at such very low subatmospheric pressures as 30 mm. Hg. Of course, at atmospheric pressure or above, the necessary pressure differential in the equipment and method of this invention is totally insignificant as a factor affecting operating temperatures, relative volatility of components, etc.

The following example does illustrate, however, the improvements in vapor-liquid contacting and mass transfer performance which can be achieved by the practice of this invention even in a system operated at normal atmospheric pressure, wherein the reduction or overcoming of the pressure per se is of little or no importance.

*Example 3.*—The same three stage column described in Example 2 was employed together with the same auxiliary equipment depicted in FIG. 1 except that no vacuum pump was attached to line 49. This equipment was used at normal atmospheric pressure to fractionate a mixture of 25 mol percent chloroform and 75 mol percent benzene.

The following table of data collected from a series of runs all of which were made at a substantially constant vapor velocity of about 0.7 ft./sec. and total reflux illustrates the effect of varying the rotor speed on the total pressure differential across all three stages of the column and upon the efficiency of the separation process.

| Rotor Speed, r.p.m. | Total $\Delta P$, mm. $H_2O$ | Mol percent Chloroform in Reflux | $E_{MV}$* (av. for 3 stages), percent |
|---|---|---|---|
| 290 | 8.5 | 47 | 41 |
| 710 | 0.5 | 60 | 75 |
| 1,010 | −1.4 | 69 | 91 |
| 1,550 | −16 | 74 | 126 |

These data demonstrate the value of the rotating assembly employed in the column of this invention in achieving good vapor-liquor contacting and high mass transfer efficiency even in cases where the counteracting of normal pressure drop is of relatively little importance. Thus, in the present example, very excellent efficiencies were obtained at all rotor speeds above about 700 r.p.m.

It should be realized that the above examples are merely typical preferred embodiments and merely illustrative of the type of results that can be achieved by practicing our invention. Many modifications and variations in the design of particular structures and components of the apparatus can, of course, be made without departing from the basic principles of our invention and the above examples are, therefore, in no way implying any limitation on the outside scope of our invention as to mechanical design details or otherwise. For example, many variations are possible in the number, size and shape of blades and elements in the vapor compressing and liquor distributing rotor assembly employed, whether a simple multibladed rotor or one including an additional superstructure mounted thereon. Also, when static vanes are employed in the column space surrounding said rotor assembly, they may be formed in an almost endless variety of forms and shapes, whether straight, simply curved, cylindrical, or formed in compound curves and other complex geometric shapes, although for purposes of economy in construction and installation without loss of effectiveness or imposition of needless additional pressure drop resistance, relatively simple shapes such as cylindrical, straight and helical vanes are preferred.

In many cases, particularly where the compressive action available from the rotor design is in excess of the crucial need for overcoming pressure drop of the basic equipment design, additional solid surfaces may be incorporated in the free spaces available for vapor-liquid contacting zones in the apparatus. For example, expanded metals, screens, metal turnings, and/or other fibrous or relatively high surface area materials can be added to the rotating members and/or the stationary parts of the apparatus. The attachment of such materials can be simplified in many cases by making use of basic structural members and/or elements available in certain preferred embodiments of this invention, such as static vanes on the column walls and rigid parts in liquor distributing superstructures atop the rotor proper.

Having described our invention together with preferred embodiments thereof, what we claim and desire to secure by U.S. Letters Patent is:

1. A vapor-liquid contacting and mass transfer device comprising a vertically disposed column divided by means of a series of substantially horizontal stationary divider plates each having a central connecting opening therethrough into a vertical series of contacting stages in the median portion of said column plus two terminal fluid handling zones, one at the top and one at the bottom of said column, each of said plates forming a complete and continuous sealed joint connection with the shell of the column so that each contacting stage occupies the full cross section of the column, a freely rotatable shaft extending concentrically through each of said central connecting openings and occupying only a minor portion of the total cross sectional area of each of said openings, and a substantially symmetrical multibladed rotor mounted on said shaft in the lower portion of each contacting stage so that at least some clearance is provided between the rotor and the divider plate at the bottom of the respective contacting stage, the outer diameter of each set of rotor blades being considerably greater than the diameter of the central connecting openings in said divider plates but considerably less than the inside dimensions of the shell of said column.

2. A device as specified in claim 1 in which each rotor is equipped with top and bottom cover plates extending to the full outer diameter of the rotor blades, the top cover plate being substantially continuous while the bottom cover plate has a central opening therein comparable in size to the opening in the stationary divider plates, and in each contacting stage there is included liquid receiving and distributing means positioned so as to receive liquid entering the stage from the divider plate above and cause it to be subjected in controlled manner to the centrifugal action achieved by the rotation of said freely rotatable shaft.

3. A device as specified in claim 1 in which there is mounted along the inside of the shell of said column in each contacting stage a series of static vanes extending substantially parallel to one another upwardly through the space between the rotor blades in said stage and the surrounding column shell.

4. A device as specified in claim 3 in which the static vanes are helical in design and are wound around the inside of said column shell while rising at an angle of about 5 to 45° to the horizontal.

5. A device as specified in claim 3 in which the static vanes are straight strips mounted vertically on the inside of said column.

6. A device as specified in claim 3 in which the static vanes are sections of cylinders or spheroids, the axes of which are straight lines between pairs of always equidistant points on the shell of said column.

7. A device as specified in claim 3 in which a cylindrically shaped roll deflector is mounted along the inside of said column beginning at a point immediately above the upper end of each of said vanes, said roll deflector presenting its concavely curved surface toward said vanes and extending over an arc of at least 90° beginning at the inside wall of said column.

8. A device as specified in claim 2 in which the said liquid receiving and distributing means included in each stage is arranged so that substantially all of the liquid received from the divider plate above will be released initially into the space above the rotor and retained in said space until it is mechanically fragmented and dispersed by said centrifugal action, thereby subjecting said liquid largely to countercurrent contact with the vapors being impelled upwardly by the action of said rotor.

9. A device as specified in claim 2 in which the said liquid receiving and distributing means included in each stage is arranged so that substantially all the liquid received from the divider plate above is released and subjected to said centrifugal force principally at a level below the top cover plate of said rotor thereby mechanically fragmenting said liquid subjecting the resulting fragmented liquid largely to concurrent contact with the vapors being impelled upwardly by the action of said rotor.

10. A device as specified in claim 2 in which the said liquid receiving and distributing means included in each stage is arranged so that the liquid received from the divider plate above is released, mechanically fragmented and dispersed partly above and partly below the top cover plate of the rotor therein.

11. A device as specified in claim 10 in which each of said horizontal divider plates above a contacting stage is provided with at least one draw-off down pipe leading directly into the contacting stage below, said down pipe being provided with a liquid access opening the size and location of which relative to the design of the central opening in the divider plate is such that the liquid reflux collecting on said divider plate tends to flow through said down pipe in preference to the central opening in said divider plate.

12. A device as specified in claim 11 in which a hub liquid seal extension is provided on the lower part of each rotor extending downwardly from the periphery of the central opening in the lower cover plate of said rotor and an upwardly extending rim is provided around the entire central opening of each divider plate below a rotor, the top of said rim being higher than the bottom of said seal extension and the inside diameter of said seal extension being larger than the outside diameter of said rim.

13. A device as specified in claim 1 wherein there is provided auxiliary, liquid-passage means in addition to the central opening in each divider plate so as to insure that liquid collecting on the top of one of said horizontal divider plates can flow freely by gravity directly therefrom into the stage immediately below.

14. A device as specified in claim 13 in which said auxiliary, liquid-passage means comprises at least one draw off pipe running through said divider plate at a point outside the outer diameter of the said rotor.

15. A device as specified in claim 13 in which said auxiliary, liquid-passage means comprises radial grooves or troughs in the upper side of each of said divider plates, said radial grooves or troughs extending from a point outside of the outer diameter of said rotors to the central openings in said divider plates.

16. A simplified method of conducting fractional distillation through a vertical series of centrally intercommunicating, vapor-liquid equilibrium contacting stages which requires no external piping, flow passages or pumps for transporting fluids between individual stages comprising impelling vapors to flow from the upper part of one stage directly into the lower part of the stage immediately above while allowing liquid condensate to feed downwards by means of gravity directly from the lower part of one stage into the central portion of the stage immediately below and using a singly driven source of centrifugal force in the lower central part of each stage to compress vapors and direct them substantially symmetrically outward and upward, to fragment mechanically the liquid condensate fed into each stage and to disperse and distribute said fragmented liquid condensate outward uniformly through the surrounding free spaces of each stage, thereby creating a substantially symmetrical and concentrically balanced flow pattern of both vapors and fragmented liquid and promoting intimate, uniform contact between said vapors and liquid throughout the free spaces of each stage.

17. A method as described in claim 16 in which the operation is conducted at pressures substantially below atmospheric and the free space provided in each stage for flow and interaction of vapors and liquids is arranged and subdivided in such a way and the flow paths of the liquids and vapors are thereby directed in such a way, in conjunction with said singly driven source of centrifugal force, so that, due to the compressive effect on the vapors simultaneously applied by said centrifugal force, the net pressure drop from stage to stage is relatively insignificant even with respect to the average reduced pressure level at which the operation is conducted.

References Cited in the file of this patent

UNITED STATES PATENTS

| | | |
|---|---|---|
| 908,465 | Jett | Jan. 5, 1909 |
| 968,307 | Yawger | Aug. 23, 1910 |
| 1,276,690 | Pyzel | Aug. 20, 1918 |
| 1,366,956 | Schneible | Feb. 1, 1921 |
| 1,468,118 | MacLachlan | Sept. 18, 1923 |
| 1,862,069 | Sybkow | June 7, 1932 |
| 1,870,351 | Wagner | Aug. 9, 1932 |
| 1,888,872 | Yarmett | Nov. 22, 1932 |
| 1,981,346 | De Florez | Nov. 20, 1934 |
| 2,122,333 | Asbury | June 28, 1938 |
| 2,209,577 | Podbielniak | July 30, 1940 |
| 2,225,804 | Spencer | Dec. 24, 1940 |
| 2,370,464 | Hickman | Feb. 27, 1945 |
| 2,722,505 | Faulkner | Nov. 1, 1955 |
| 2,847,200 | Ung | Aug. 12, 1958 |

FOREIGN PATENTS

| | | |
|---|---|---|
| 971,919 | Germany | Apr. 16, 1959 |